United States Patent
Manoharan et al.

(10) Patent No.: US 6,974,619 B2
(45) Date of Patent: Dec. 13, 2005

(54) HIERARCHICAL MATERIALS

(75) Inventors: Mohan Manoharan, Niskayuna, NY (US); William Paul Minnear, Clifton Park, NY (US); Reza Sarrafi-Nour, Clifton Park, NY (US); Krishan Lal Luthra, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 48 days.

(21) Appl. No.: 10/747,724

(22) Filed: Dec. 26, 2003

(65) Prior Publication Data

US 2005/0147829 A1 Jul. 7, 2005

(51) Int. Cl.[7] ................................................. B32B 5/00
(52) U.S. Cl. .................. 428/98; 428/446; 428/426; 428/432; 428/304.4; 428/689; 428/697; 428/698; 428/704; 428/702; 428/457
(58) Field of Search ................ 428/457, 446, 428/426, 432, 304.4, 689, 697–698, 702, 428/704, 98

(56) References Cited

U.S. PATENT DOCUMENTS 5,869,929 A * 2/1999 Eida et al. .................. 313/501

6,471,761 B2 10/2002 Fan et al.

FOREIGN PATENT DOCUMENTS

WO 03048246 6/2003

* cited by examiner

Primary Examiner—Ling Xu
(74) Attorney, Agent, or Firm—Paul J. DiConza; William E. Powell, III

(57) ABSTRACT

A material and an article comprising the material are presented. The material comprises a plurality of structural components. The structural components are configured in a series of increasing structural component size classes. The series has a base unit size class and at least one modular size class, and a component of the at least one modular size class comprises a plurality of components of the next smaller size class in the series. The structural components of the base unit size class comprise at least one bulk phase, and the structural components are bonded together at interfaces. Mechanical damage originating within a modular size class structural component is energetically favored to propagate in a distributed fashion among the plurality of structural components contained within the modular size class structural component.

26 Claims, 3 Drawing Sheets

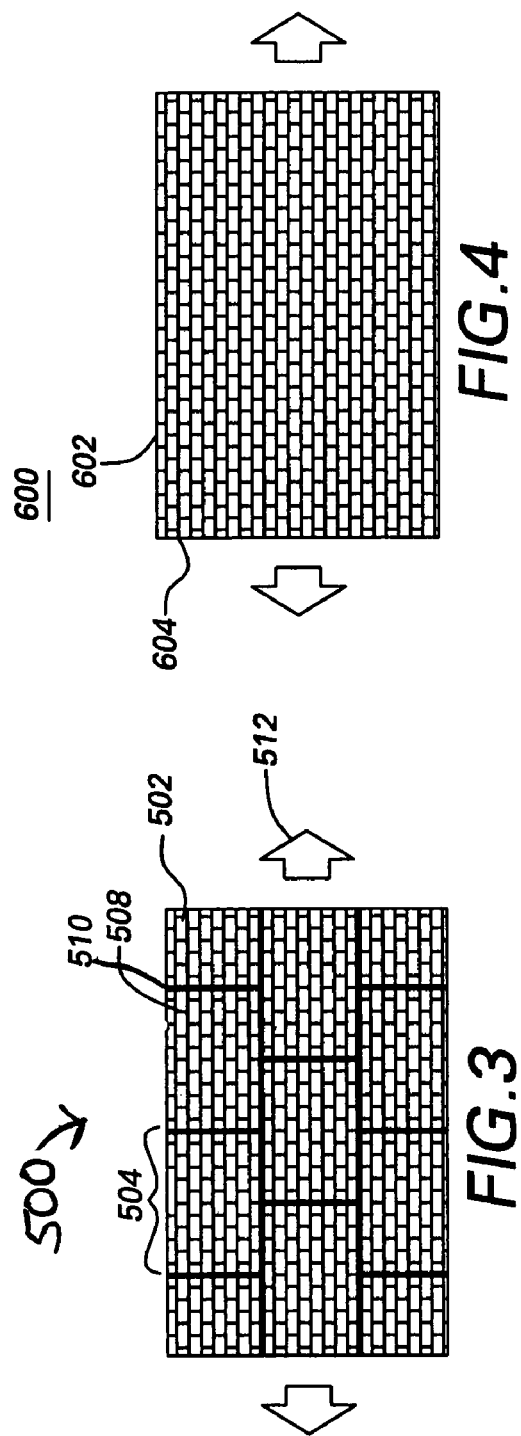
FIG.3
FIG.4
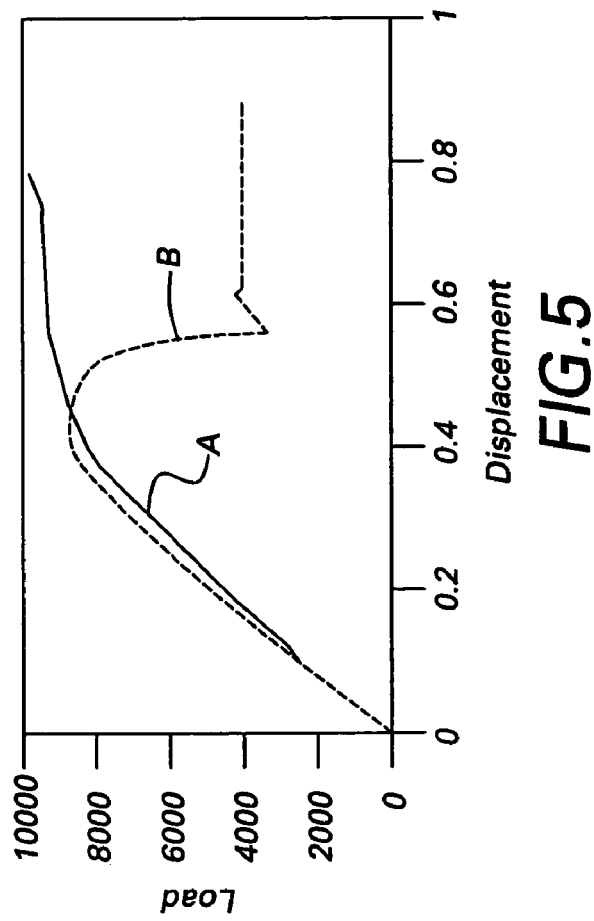
FIG.5

HIERARCHICAL MATERIALS

BACKGROUND OF THE INVENTION

This invention relates to materials for use at high temperatures. More particularly, this invention relates to materials designed for enhanced toughness at high temperatures. This invention also relates to methods for making such materials.

Materials with the capability to maintain adequate properties at extremely high temperatures are highly sought after for use in several widely varying applications, including, for example, space vehicles, turbine equipment for power generation plants and aircraft engines, and metal forming and glass blowing equipment. For instance, increasing the temperature of the combustion gases used to drive a gas turbine generally increases the potential efficiency with which the turbine can generate power. However, the alloys and protective coatings used to fabricate turbine components typically operate at or near their temperature limits in state-of-the-art turbine equipment, and even a modest increase in firing temperature of such a turbine would degrade the performance of these materials in any of a number of properties, including, for example, strength, oxidation resistance, and creep resistance.

Many ceramic materials easily surpass metals in certain high-temperature properties, and therefore offer a potential solution to the limitations of alloys noted above. Ceramics in general are stronger and lighter than high temperature alloys, and resist environmental attack and creep much more effectively. However, ceramic materials have seen relatively little use in many engineering structural components due to their low tolerance for damage. Ceramics tend to be brittle and highly susceptible to rapid catastrophic failure when overloaded, particularly in situations where the ceramic contains mechanical damage in the form of cracks, voids, porosity, or other discontinuity. Brittle materials like ceramics tend to fail with very little to no plastic (permanent) deformation, and the energy required to effect a complete fracture, a quantity often referred to in the art as "toughness," is comparatively low. Metals and alloys, on the other hand, generally require a comparatively high amount of energy before failing because they exhibit significant amounts of plastic deformation, which discourages formation of cracks and voids, blunts existing crack tips, and otherwise accommodates damage in a way that forestalls catastrophic failure. Materials with high toughness tend to tolerate damage to a much larger extent than brittle materials, due to their ability to "absorb" higher amounts of energy before failing. To be useful, materials that take advantage of the benefits offered by ceramics must also possess some mechanism for enhancing overall toughness and damage tolerance.

One of the most commonly used strategies for achieving the needed balance of strength with toughness in materials incorporating ceramics is the development of a composite material, where multiple materials are combined in a fashion to optimize their advantages while minimizing their disadvantages. Several classes of composite materials have been developed to exploit ceramics. For example, metal-matrix composites include a tough, ductile metal, such as an aluminum or nickel alloy, into which is included a hard, strong, but brittle ceramic that reinforces the softer metal. The incorporation of the ceramic boosts the strength of the composite, while the presence of the ductile metal matrix maintains requisite levels of toughness and damage tolerance. In metal matrix composites, then, the mechanism used to absorb stress and thereby enhance toughness is the plastic deformation of the metal matrix.

Ceramic matrix composites do not include a tough metal phase in the matrix and thus generally employ a different toughening mechanism than metal matrix composites. For instance, in fiber reinforced ceramic matrix composites, an interfacial layer of material may be engineered to be weaker than the respective materials comprising the fiber and the matrix. In such situations strain energy may be absorbed, and failure delayed, by the formation and propagation of multiple small cracks along the fiber interfaces, by frictional sliding of the fiber within the matrix, and other alternative failure modes, instead of the formation and rapid, catastrophic propagation of one large crack as is commonly observed in monolithic ceramics. Ceramic matrix composite materials thus attempt to derive toughening in the absence of plastic deformation through the incorporation of failure mechanisms that allow for a slower, more incremental failure.

Although conventional ceramic matrix composites (CMC's) have shown improvements in toughness and damage tolerance over monolithic ceramic materials, issues remain that detract from the ability to fully capitalize on the benefits offered by ceramic materials. Composite materials in general are mixtures that generally perform only as well as the worst performing constituent in the mixture. For example, poor oxidation resistance in fiber materials results in poor oxidation resistance for the entire composite, because the preferential degradation of the reinforcing fibers has a major effect on the properties of the overall material. Clearly, there is a need for improved materials with high temperature capability and adequate damage tolerance to survive demanding applications.

BRIEF DESCRIPTION

Embodiments of the present invention address this and other needs. One embodiment is a material comprising a plurality of structural components. The structural components are configured in a series of increasing structural component size classes. The series has a base unit size class and at least one modular size class, and a component of the at least one modular size class comprises a plurality of components of the next smaller size class in the series. The structural components of the base unit size class comprise at least one bulk phase, and the structural components are bonded together at interfaces. Mechanical damage originating within a modular size class structural component is energetically favored to propagate in a distributed fashion among the plurality of structural components contained within the modular size class structural component.

A second embodiment is an article comprising the material described above.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a cross-sectional schematic of a simulated two-level hierarchical material in accordance with certain embodiments of the present invention;

FIG. 4 is a cross-sectional schematic of a simulated, one-level hierarchical material; and FIG. 5 is a graph depicting load-displacement data generated in a computer simulated test of the materials depicted in FIGS. 3 and 4.

DETAILED DESCRIPTION

Figure 1:
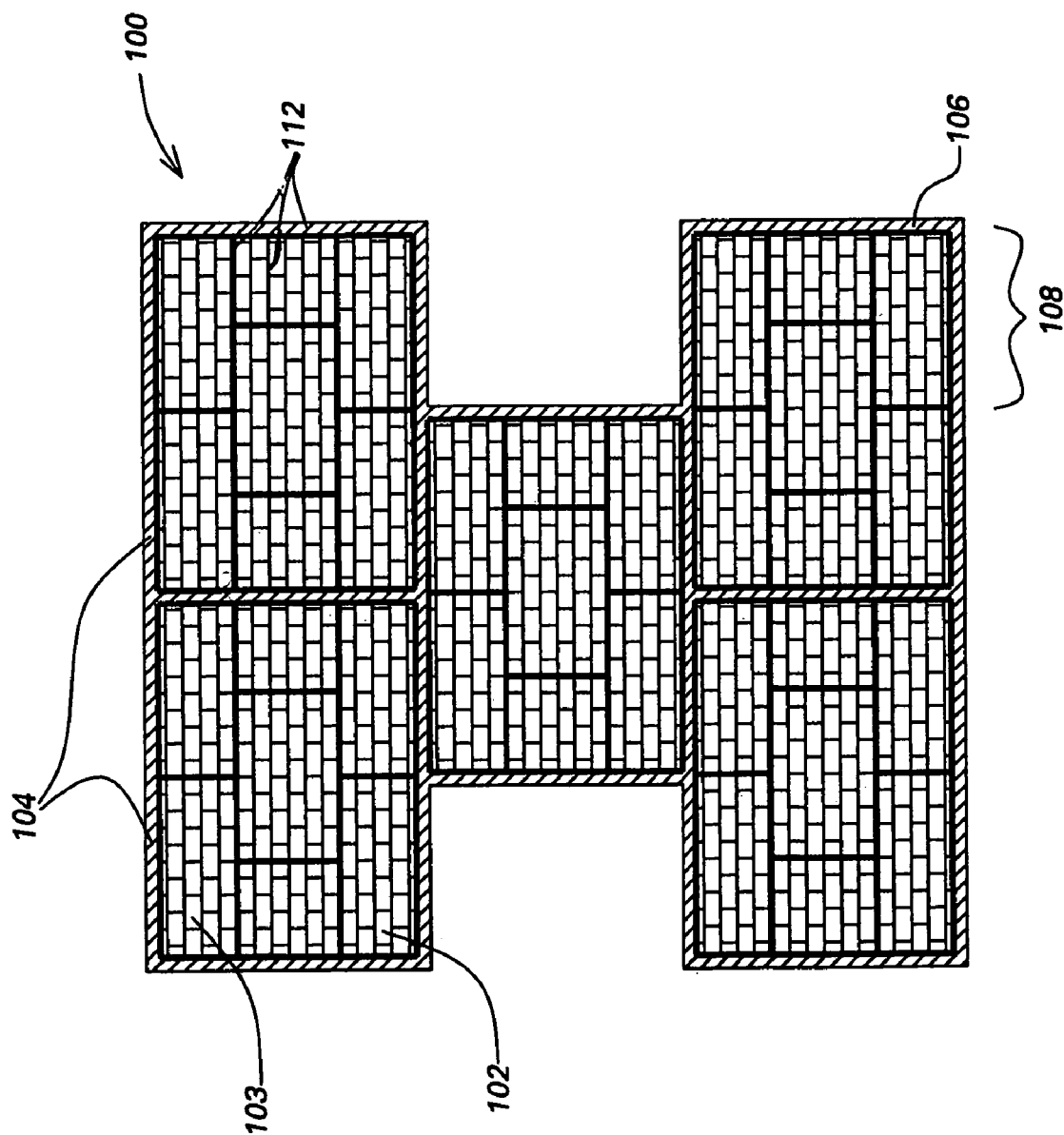
FIGS. 1 and 2 are cross-sectional schematics of exemplary embodiments of the present invention.

Referring to the drawings in general and to FIG. 1 in particular, it will be understood that the illustrations are for the purpose of describing an exemplary embodiment of the invention and are not intended to limit the invention thereto. FIG. 1 is a schematic representation of a material in accordance with the present invention. The material comprises a plurality of structural components 100 configured in a series of increasing structural component size classes. A structural component, in accordance with embodiments of the present invention, is a unit of structure into which the material of the present invention is organized, and can be analogized as the "building blocks" from which the material is made. As used herein, "size class" refers to a class of components wherein each component of the class has a characteristic length that is within about 25% of a mean characteristic length for the entire class. A characteristic length is any convenient dimension of a structural component applied consistently across all size classes to characterize the structural components, such as, for example, the diameter of components having circular cross-sections, or the length of a longitudinal or transverse leg of a component having a rectangular cross section.

The series of structural component size classes has a base unit size class 102 and at least one modular size class 104. The base unit size class contains structural components having the smallest characteristic length in the material. Components of the base unit size class 102 are thus the fundamental structural components of the material. Any of a variety of structures is suitable to serve as a base unit size class structural component, including, as illustrative examples, a fiber of the sort used in conventional composite lamination processes; a band of deposited material as is commonly fabricated in lithography processes; and a self-assembled cluster of molecules of the type used in molecular self-assembly processes. The base unit size class structural components comprise at least one bulk phase 103. Bulk phase 103, in some embodiments, comprises at least one of a ceramic, an organic material, and a metal. In certain embodiments, bulk phase 103 comprises a ceramic material, and the ceramic material comprises at least one of a boride, a nitride, an oxide, a carbide, a silicide, a silicate, and mixtures and compounds thereof. Specific examples of suitable ceramic materials include, but are not limited to, silicon carbide, titanium carbide, zirconium carbide, hafnium carbide, molybdenum carbide, tantalum carbide, silicon nitride, silicon aluminum oxynitride, aluminum nitride, titanium nitride, titanium diboride, molybdenum disilicide, aluminum oxide, and aluminum silicate.

Components of the at least one modular size class 104 comprise a plurality of components of the next smaller size class in the series. Examples of suitable modular size class structural components include, but are not limited to, a filament comprising a plurality of co-extruded fibers; a laminated block of material comprising a plurality of the aforementioned filaments; a layer comprising a plurality of bands of material, fabricated using photolithography or other patterned deposition process; a block of material comprising a plurality of the aforementioned layers; a cylindrical tube resulting from the spontaneous assembly of self-assembled molecular clusters; and a filament comprising a plurality of the aforementioned tubes. The material of the present invention is thus a multiple-level hierarchical material where structural components of a base unit size class are assembled to form larger, modular structural components, which, in some embodiments, in turn are assembled to form even larger modular structural components, and so on to the largest size class in the series.

In the exemplary embodiment illustrated in FIG. 1, the plurality of structural components 100 is represented in cross section as a series of brick-like components, although it will be appreciated that each "brick" could actually run semi-infinitely in the direction perpendicular to the cross-sectional area projection shown, as a fiber or band of material would, for example. A typical "brick" of the largest size class 106 comprises a plurality of "bricks" of the next smaller size class 108, which in turn comprises a plurality of "bricks" of the base unit size class 110. This exemplary embodiment is thus a three-level hierarchical material, because the structural components of the material are configured in a series of three increasing structural component size classes. In contrast, a typical brick wall may be thought of as a single level "hierarchy" because it comprises structural components (bricks) having only one size class.

Those skilled in the art will appreciate that in embodiments of the present invention there is no theoretical upper limit to the permissible number of size classes in the series of progressively increasing structural component size classes, although practical limitations imposed by the selected fabrication process may arise. In certain embodiments, the number of size classes in the series is at least two, and in particular embodiments the number of size classes in the series is in the range of from three to five. As will be explained below, having more than one size class serves to significantly slow the spread of damage through the material and forestall catastrophic failure, offering the opportunity, usually not available in conventional ceramic materials, to detect damage before failure occurs.

The size of the base unit size class structural components is determined by the degree of control allowed by the process used to create these components. For example, commonly used molecular self-assembly techniques are capable of fabricating structural components, such as molecular clusters, having a mean characteristic length on the order of about 10 nanometers, while conventional fiber manufacturing methods and lithography techniques are generally limited to a minimum characteristic length on the micrometer length scale. On the other hand, the largest size class of structural component in a material is limited only by the actual dimensions of the component fabricated from the material.

In particular embodiments, such as that illustrated in FIG. 1, substantially all of the structural components 100, that is, greater than about 80% of the components 100 in a given sample of material, have a substantially similar shape, although such a condition is not necessary to the general operability of the material. The shape of a structural component 100 is characterized by a cross sectional geometry, such as, for instance, the rectangular shape of the components 100 depicted in FIG. 1. The term "substantially similar shape" herein means the structural components differ in size but the general geometric form of a component of one size class does not vary from that of a component of a different size class to a degree where one of ordinary skill in the art would characterize the geometric forms as different. For example, the brick-shaped cross-section of the components as depicted in FIG. 1 would be characterized as substantially similar rectangles by one skilled in the art even if, for example, minor departures from precise right angles and some minor rounding of corners were noted among components of varying size classes. Various cross-sectional shapes are suitable for use as structural components 100, including, but not limited to rectangular cross sections and circular cross sections.

Figure 2:
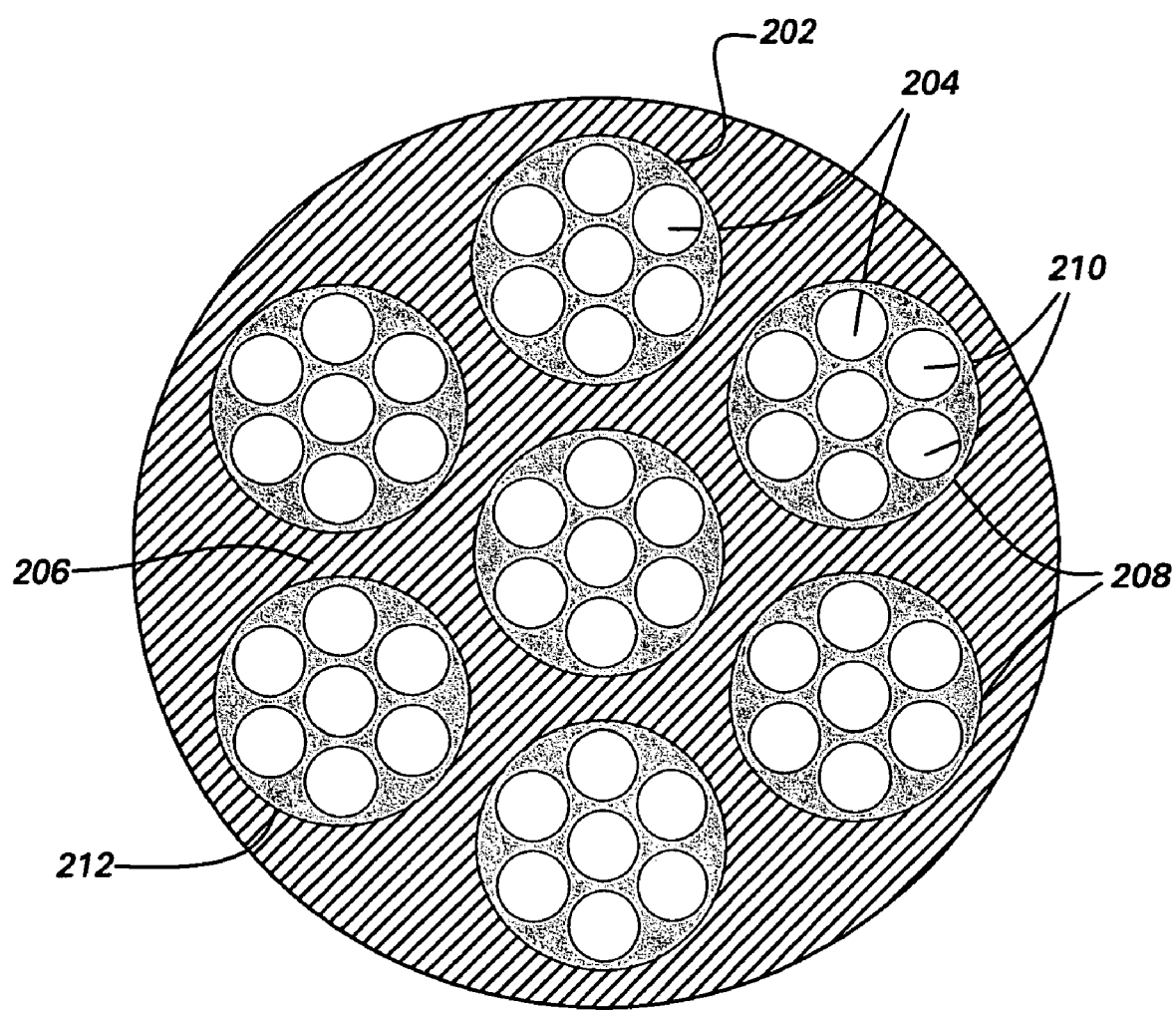

The structural components 100 of all size classes in the series are bonded together at interfaces 112, such as, for example, mechanically interlocked interfaces, chemically bonded interfaces, and interfaces that use a combination of mechanical interlocking and chemical bonding to bond structural components together. The interfaces 112 typically bond the structural components 100 in more than one dimension, such as, for example, interfaces that bond structural components in all three dimensions. Chemically bonded interfaces comprise at least one interfacial phase, distinct from the bulk phase 103, which acts as an adhesive in bonding structural components 100 together. In certain embodiments, the at least one interfacial phase used to bond structural components 100 together comprises a material selected from the group consisting of a ceramic, a glass ceramic, carbon, and combinations thereof. Examples of suitable ceramic materials for the interfacial phase include, but are not limited to, hexagonal boron nitride, lanthanum phosphate, aluminum oxide (alumina), titanium silicon carbide ($Ti_3SiC_2$), silica, zirconia, and mixtures and compounds of any of the foregoing materials. The interfacial phase in certain embodiments is the same throughout the material, regardless of what size class of structural component is being bonded. In alternative embodiments, as shown in FIG. 2, interfaces 202 bonding structural components of a first size class 204 comprise a different material than interfaces 206 bonding structural components of a second size class 208. It will be appreciated that the use of the terms "first" and "second" herein are not meant to refer to absolute or relative positions of size class in the series of component size classes, but are merely used to distinguish one size class from another without reference to their place in the series. In particular embodiments, each size class of structural components is bonded together by interfaces comprising a material that is unique to the interfaces bonding that size class. For example, in a material having three size classes of structural components, the base-unit size class components are bonded together by interfaces comprising a first material, the modular size class components that comprise only these base-unit components (i.e., the next size class in the series) are bonded together by interfaces comprising a second material, and the largest size class components are bonded together by a third interfacial material, such that the first, second, and third interfacial materials are different from each other.

Fabricating an interfacial phase is readily accomplished by any of several well-known methods, including, for instance, coating methods and infiltration methods. Coating methods are used to encase a structural component with a material desired for use as an interfacial phase, and then the coated components are packed together so that the coating material is disposed in the interstices between the packed structural components. For example, monolithic ceramic fibers are coated with a desired interfacial material, and then a plurality of coated fibers, still in a green state (that is, still containing binders and plasticizers to enable mechanical processing) are co-extruded together to form a filament comprising a plurality of base unit structural components (the monolithic fibers) bonded together by an interfacial phase (the material coated onto the fibers). This filament, which in accordance with embodiments of the present invention is a modular size class component, is in turn coated with a material desired to be a second interfacial phase, and a plurality of such coated filaments is co-extruded to form a larger size class filament comprising a plurality of structural components (the smaller filaments) bonded together by an interfacial phase (the second interfacial phase). In alternative embodiments, interfacial material is fabricated by selective deposition of desired material in a lithography process, sometimes preceded by a selective etch process to create an interfacial region to receive the interfacial material. Alternatively, in certain embodiments, interfacial material is disposed in desired locations by infiltrating a porous network running through the material, as where, for example, the bulk phase is a mesoporous ceramic oxide and the interfacial material is infiltrated via vacuum infiltration into the mesoporous network of the oxide. Coating methods include, but are not limited to, chemical vapor deposition, physical vapor deposition, application by spraying or dipping, sol-gel processing, and the like.

Mechanically interlocked interfaces, on the other hand, do not rely on the presence of an interfacial phase to achieve bonding of structural components, but instead rely on mechanical interactions between the surfaces of the structural components to create and maintain the bond. In certain embodiments, mechanically interlocked interfaces are designed to have rough features, known as asperities, that accommodate inelastic deformation through a sequence of sliding and interlocking events. The sequential sliding and interlocking at the interface, subject to transverse constraint by the bulk of the material, results in residual displacements accompanied by strain hardening. The sliding process along the interface relaxes stress concentrations and hence retards the formation of a dominant crack, while the strain hardening behavior allows multiple sites along neighboring interfaces to be activated and to participate in the process. In these embodiments, the amplitude and wavelength of the asperities along the interface are designed to be large enough to allow formation of multiple sites but not large enough to give rise to a local interlocking event of sufficient magnitude to cause stress concentration and failure of the material. For example, it is known in the art that when the interfacial sliding occurs under a friction coefficient of 0.01–0.1, the asperities have to be about 20–50 nm in amplitude and separated by a wavelength of about 50–200 nm in order to achieve a proper balance of the factors described above. Examples of such interlocking interfaces can be found in the structure of nacre, also known as mother-of-pearl. Compacted (but not sintered) powders and co-extruded fibers (without interfacial phase additions) are examples of structural components bonded by mechanically interlocked interfaces in engineered materials.

The combination of hierarchical structure and specific bulk phase and interfacial phase materials selection creates in the material of the present invention an advantageous condition in which mechanical damage, such as, for example, cracks, voids, porosity, and the like, originating within a modular size class structural component, is energetically favored, that is, requires less work, to propagate in a distributed fashion among the plurality of structural components contained within the modular size class structural component. Certain embodiments of the present invention achieve this distributed failure mode by manipulating the properties of the interfaces 112. Referring to FIG. 2, in some embodiments a toughness of the interfaces 206 bonding together modular size class structural components 208 is greater than a toughness of the interfaces 202 bonding together the plurality of structural components 204 contained within the modular size class structural components 208. As described above, toughness is a term well understood in the art to mean the work, also referred to as energy, required to cause a complete fracture of a material. Thus the interfaces that are the easiest to fracture in the material, the ones along which damage is most likely to propagate, are the interfaces bonding the base unit size class components 204, and the interfaces are designed, often through materials selection, to be progressively tougher as the size class of the structural components being bonded together by the interfaces increases. Additionally, the toughness of the interfaces 206 bonding the modular size class structural components 208 together is less than a toughness of the at least one bulk phase 210, so the toughest portion of the material, the area least likely to propagate damage, is the material comprising the base unit size class components 210. In this way, damage 212 is energetically favored to travel along the highly convoluted pathway created by the interfaces 202 of the smallest size class structural components, rather than directly through the material as is common in conventional ceramic materials, resulting in more energy being required to effect a complete fracture of the overall material. Catastrophic crack propagation is contained through crack blunting and deflection by the numerous interfaces between structural components, thereby providing a more distributive failure mode that allows the material to retain its integrity even while damaged. The material of the present invention thus takes advantage of the benefits of ceramic materials but has a significantly enhanced toughness than these materials generally exhibit.

The properties, such as the toughness, of the interfaces 112 (FIG. 1) may be controlled by manipulating the chemical composition of the interfaces 112, by manipulating their physical structure, or a combination of both of these. For instance, interfaces comprising boron nitride (BN) are used to bond base unit size class components together into modular size class components. The modular size class components are bonded together at interfaces comprising a mixture of aluminum oxide and BN, which is tougher than BN, to form a material that energetically favors damage propagation along the BN interfaces, in accordance with embodiments of the present invention.

Structure of the interfaces also may be manipulated to control interfacial toughness. For example, in some embodiments the interfaces 112 comprise material having a predetermined porosity level. In particular embodiments, the porosity level of an interface 112 varies as a function of the size class of the structural components 100 corresponding to the interface 112. For example, in some embodiments, the chemically bonded interfaces (i.e., those interfaces that comprise an interfacial phase) comprise sintered material. Those skilled in the art will appreciate that by controlling sintering parameters, such as, for example, sintering temperature, time, and starting material, the porosity of the material being sintered, and hence that of the interfaces in this embodiment, can be controlled to a desirable level. Where coating or infiltration processes are used to dispose a material to be used as interfacial phase onto a structural component, the processing parameters are manipulated according to known relationships to control porosity levels to achieve the desired result. In general the higher the interfacial porosity, the weaker and less tough the interface is, because there is less material at the interface to create bonding sites.

Other embodiments of the present invention include an article comprising the material of the present invention, as that material is described herein. In particular embodiments, the article comprises a component of a gas turbine assembly, including, but not limited to, turbine blades, vanes, shrouds, and combustor components.

Materials and articles in accordance with embodiments of the present invention are fabricated using any of a variety of techniques that are known to those skilled in the art, including, but not limited to, self-assembly techniques, conventional lamination techniques, and lithographic techniques. Molecular self-assembly techniques are "bottom-up" approaches to fabrication, in which chemical precursors having a strong polar character align themselves into predictable, periodic structures assembled in accordance with electrostatic interactions among the molecules of the precursors. Depending on the choice of precursors, this assembly may be spontaneous (due to naturally occurring interactions), or it may be stimulated by the application of external electric, magnetic, or other field, a technique known as "guided self-assembly." Certain techniques use a combination of spontaneous and guided self-assembly to stimulate the assembly of structures into useful three-dimensional geometries, such as, for example, fibers, sheets, and spheres. Multiple phase structures consistent with embodiments of the present invention, such as where the material comprises at least one bulk phase and at least one interfacial phase, may be obtained by, as a non-limiting example, assembling the bulk phase into a mesoporous "framework" and then infiltrating the pores with the interfacial phase as described above. Interfacial phase material may also be coated as previously described onto the surface of particles or assemblies comprising the at least one bulk phase using any of a number of suitable techniques well known in the art. At various steps along the processing route, those skilled in the art will appreciate that various conversion steps may be used to convert precursors into intermediate or final compositions. Conversion steps may include exposure to heat, other chemical compounds, electromagnetic radiation, and other external influences suitable to effect a chemical composition change. As a result of the molecular self-assembly process, three-dimensional hierarchies of material are built up from molecular precursors, and can then be formed into the desired shape by any of several suitable processes, including, but not limited to, extrusion, injection molding, and the like.

Lamination techniques for processing composite materials are well known in the art, and are suitable for use in fabricating materials of the present invention. As a non-limiting example, monolithic ceramic fibers or rods of any of a wide variety of cross sectional shapes, having first interfacial material disposed in the interstices between the fibers (such as, for example, by coating the fibers or rods with the interfacial material prior to extruding) are co-extruded to form filaments, where each filament contains a plurality of fibers bonded together by the first interfacial material. These filaments then are coated with a layer of a second interfacial material that serves as the interfacial material binding filaments together when the filaments are laminated together, co-extruded, or otherwise processed to form the next level of structural component in the series. This second interfacial material is selected to have properties, such as toughness, in keeping with certain embodiments of the invention described above, to promote the distribution of damage among the structural components contained within the filaments (e.g., along the paths defined by the first interfacial material).

Photolithography and other lithographic techniques are another class of well-known fabrication techniques suitable for use in manufacturing materials of the present invention.

These methods use combinations of targeted etching and selective material deposition to form a desired pattern on a substrate. The pattern may be two or three dimensional, and can be built up to a desired thickness by repetition of the pattern a requisite number of times. Appropriate use of known selective deposition and etching techniques enables the fabrication of the various structural components and corresponding interfaces. For example, a layer of bulk phase material is deposited on a substrate, and then selectively etched to form a series of closely spaced stripes of bulk phase. The stripes are the base-unit size class structural component in the material being fabricated. A first interfacial material is then selectively deposited in the interstices between the stripes. This layer of bulk phase bonded together with first interfacial phase is a modular size class structural component. The layer is then coated with a second interfacial material having a higher toughness than the first interfacial phase but a lower toughness than that of the bulk phase, and then another layer of bulk phase/first interfacial material is deposited on top of the second interfacial material as in the prior layer. This pattern may be repeated to form a hierarchical material of a desired thickness.

EXAMPLE

The following example is presented to further describe and explain embodiments of the present invention and is not to be understood as limiting the scope of the invention in any way.

Referring to FIG. 3, a computer simulation was designed to model the behavior of a material 500 in accordance with embodiments of the present invention. The structural components of the base unit size class 502 were rectangular bricks in cross-section, and these bricks 502 were organized into rectangular modular size class structural components 504 such that each modular size component 504 comprised five courses of six bricks 502 per course. The first interfacial material 508 bonding the bricks 502 together was modeled to have a toughness that was a factor of 0.1 times that of the second interfacial material 510 bonding the modular size class components 504 together, and a factor of 0.01 times that of the bricks 502 themselves. The material 500 modeled in the simulation consisted of five courses of modular size class structural components 504, at three components 504 per course. The model simulated a uniaxial stress state 512 applied to the material 500, wherein the boundary of the model material at one end was fixed and a constant displacement was applied to the opposite end, incrementally increased in steps of a fixed displacement quantity. The response load at this opposite end was calculated at each step, and the stepwise increase in displacement was carried out until the model indicated failure of the material. For comparison, referring to FIG. 4, a second simulated material 600 was modeled, where the second material 600 consisted only of bricks 602 and an interfacial material 604 bonding the bricks together. The boundary conditions were the same for this comparison material 600, except this material 600 lacked the presence of modular size class structural components 504 that are present in the material of the present invention. Thus the second simulated material 600 modeled a single-level "hierarchy" and the first material 500 modeled a two-level material hierarchy.

The simulation results clearly indicated the superiority of the material of the present invention over that of a single-level hierarchical material. FIG. 5 depicts load-displacement data for the two-level hierarchical material 500 (FIG. 3), labeled as curve A, and for the single-level material 600 (FIG. 4), labeled as curve B. Curve A clearly shows higher strength (relative height of curve) and toughness (area under curve) than curve B, demonstrating superior mechanical properties attributable to the hierarchical structure and materials selection of the material of the present invention.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. A material comprising:
   a plurality of structural components bonded together at interfaces, each structural component having a characteristic length, said components configured in a plurality of structural component size classes, wherein each structural component belonging to an exemplary size class has a characteristic length that is within 25% of a mean characteristic length calculated for all structural components of the exemplary size class, and wherein each size class has a unique mean characteristic length;
   wherein a base unit size class has the smallest mean characteristic length of all structural component size classes, and
   wherein said structural components of said base unit size class comprise at least one bulk phase;
   wherein any structural component size class that is not said base unit size class is a modular size class, and wherein a structural component of an exemplary modular size class comprises
      (i) a plurality of structural components of the base unit size class, and
      (ii) a plurality of structural components of modular size classes having mean characteristic lengths less than that of the exemplary modular size class; and
   wherein interfaces bonding together structural components of an exemplary modular size class require more energy to propagate mechanical damage than interfaces bonding together structural components contained within structural components of said exemplary modular size class.

2. The material of claim 1, wherein interfaces bonding together structural components of an exemplary modular size class have a toughness that (i) is greater than a toughness of interfaces bonding together structural components contained within the structural components of said exemplary modular size class, and (ii) is less than a toughness of said at least one bulk phase.

3. The material of claim 1, wherein said interfaces are selected from the group consisting of mechanically interlocked interfaces, chemically bonded interfaces, and combinations thereof.

4. The material of claim 3, wherein said interfaces bond said structural components in more than one dimension.

5. The material of claim 4, wherein said interfaces bond said structural components in three dimensions.

6. The material of claim 3, wherein said interfaces comprise chemically bonded interfaces, and wherein said interfaces comprise at least one interfacial phase.

7. The material of claim 6, wherein structural components belonging to a first size class are bonded together by first interfaces, wherein structural components belonging to a second size class are bonded together by second interfaces, and wherein said first interfaces comprise a different material than said second interfaces.

8. The material of claim 7, wherein structural components of like size class are bonded together by interfaces comprising a material unique to interfaces bonding structural components of said like size class.

9. The material of claim 6, wherein said interfacial phase comprises a material selected from the group consisting of a ceramic, a glass-ceramic, carbon, and mixtures thereof.

10. The material of claim 9, wherein said interfacial phase comprises at least one of hexagonal boron nitride, lanthanum phosphate, aluminum oxide (alumina), titanium silicon carbide ($Ti_3SiC_2$), silica, zirconia, and mixtures of any of the foregoing materials.

11. The material of claim 3, wherein said chemically bonded interfaces comprise sintered material.

12. The material of claim 1, wherein said at least one bulk phase comprises at least one of a ceramic, an organic material, and a metal.

13. The material of claim 12, wherein said ceramic comprises at least one of a nitride, an oxide, a carbide, a silicide, a silicate, and mixtures thereof.

14. The material of claim 13, wherein said ceramic comprises silicon carbide, titanium carbide, zirconium carbide, hafnium carbide, molybdenum carbide, tantalum carbide, silicon nitride, silicon aluminum oxynitride, aluminum nitride, titanium nitride, titanium diboride, molybdenum disilicide, aluminum oxide, and aluminum silicate.

15. The material of claim 1, wherein substantially all of said structural components have a substantially similar shape.

16. The material of claim 15, wherein said shape is characterized by a cross sectional geometry, and wherein said geometry is one of rectangular and circular.

17. The material of claim 1, wherein said Interfaces of said structural components comprise material having a predetermined porosity level.

18. The material of claim 17, wherein said porosity level varies as a function of said component size class.

19. A material comprising:
a plurality of structural components bonded together at interfaces, each structural component having a characteristic length, said components configured in a plurality of structural component size classes, wherein each structural component belonging to an exemplary size class has a characteristic length that is within 25% of a mean characteristic length calculated for all structural components of the exemplary size class, and wherein each size class has a unique mean characteristic length;
wherein a base unit size class has the smallest mean characteristic length of all structural component size classes, and wherein said structural components of said base unit size class comprise at least one bulk phase comprising at least one of a nitride, an oxide, a carbide, a suicide, a silicate, and mixtures thereof;
wherein said interfaces are chemically bonded interfaces comprising at least one interfacial phase, said interfacial phase comprising a ceramic, a glass-ceramic, carbon, and mixtures thereof;
wherein any structural component size class that is not said base unit size class is a modular size class, and
wherein a structural component of an exemplary modular size class comprises
(i) a plurality of structural components of the base unit size clan, and
(ii) a plurality of structural components of modular size classes having mean characteristic lengths less than that of the exemplary modular size class;
wherein interfaces bonding together structural components of an exemplary modular size class have a toughness that (i) is greater than a toughness of interfaces bonding together structural components contained within the structural components of said exemplary modular size class, and (ii) is less than a toughness of said at least one bulk phase.

20. An article comprising:
a material comprising a plurality of structural components bonded together at interfaces, each structural component having a characteristic length, said components configured in a plurality of structural component size classes, wherein each structural component belonging to an exemplary size class has a characteristic length that is within 25% of a mean characteristic length calculated for all structural components of the exemplary size class, and wherein each size class has a unique mean characteristic length;
wherein a base unit size class has the smallest mean characteristic length of all structural component size classes, and wherein said structural components of said base unit size class comprise at least one bulk phase;
wherein any structural component size class that is not said base unit size class is a modular size class, and wherein a structural component of an exemplary modular size class comprises
(iii) a plurality of structural components of the base unit size class, and
(iv) a plurality of structural components of modular size classes having mean characteristic lengths less than that of the exemplary modular size class; and
wherein interfaces bonding together structural components of an exemplary modular size class require more energy to propagate mechanical damage than interfaces bonding together structural components contained within structural components of said exemplary modular size class.

21. The article of claim 20, wherein interfaces bonding together structural components of an exemplary modular size class have a toughness that (i) is greater than a toughness of interfaces bonding together structural components contained within the structural components of said exemplary modular size class, and (ii) is less than a toughness of said at least one bulk phase.

22. The article of claim 21, wherein said interfaces comprise chemically bonded interfaces, and wherein said interfaces comprise at least one interfacial phase.

23. The article of claim 22, wherein said interfacial phase comprises a material set acted from the group consisting of a ceramic, a glass-ceramic, carbon, and mixtures thereof.

24. The article of claim 20, wherein said at least one bulk phase comprises at least one of a nitride, an oxide, a carbide, a silicide, a silicate, and mixtures thereof.

25. The article of claim 20, wherein said article comprises a component of a gas turbine assembly.

26. An article comprising:
a material comprising
a plurality of structural components bonded together at interfaces, each structural component having a characteristic length, said components configured in a plurality of structural component size classes, wherein each structural component belonging to an exemplary size class has a characteristic length that is within 25% of a mean characteristic length calculated for all structural components of the exemplary size class, and wherein each size class has a unique mean characteristic length;

wherein a base unit size class has the smallest mean characteristic length of all structural component size classes, and wherein said structural components of said base unit size class comprise at least one bulk phase comprising at least one of a nitride, an oxide, a carbide, a suicide, a silicate, and mixtures and compounds thereof;

wherein said interfaces are chemically bonded interfaces comprising at least one interfacial phase, said interfacial phase comprising a ceramic, a glass-ceramic, carbon, and mixtures thereof;

wherein any structural component size class that is not said base unit size class is a modular size class, and wherein a structural component of an exemplary modular size class comprises (i) a plurality of structural components of the base unit size class, and (ii) a plurality of structural components of modular size classes having mean characteristic lengths less than that of the exemplary modular size class;

wherein interfaces bonding together structural components of an exemplary modular size class have a toughness that (i) is greater than a toughness of interfaces bonding together structural components contained within the structural components of said exemplary modular size class, and (ii) is less than a toughness of said at least one bulk phase.

* * * * *